(12) United States Patent
Jindal et al.

(10) Patent No.: US 10,703,235 B2
(45) Date of Patent: Jul. 7, 2020

(54) SLIDEABLY RELEASABLE CENTER CONSOLE

(71) Applicant: Ford Global Technologies, LLC, Dearborn, MI (US)

(72) Inventors: Pardeep Kumar Jindal, Canton, MI (US); Rahul Makwana, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 137 days.

(21) Appl. No.: 15/966,663

(22) Filed: Apr. 30, 2018

(65) Prior Publication Data

US 2019/0329679 A1 Oct. 31, 2019

(51) Int. Cl.
| | |
|---|---|
| *B60R 7/04* | (2006.01) |
| *B60N 2/427* | (2006.01) |
| *B60N 2/42* | (2006.01) |
| *B60R 21/02* | (2006.01) |
| *B60R 21/00* | (2006.01) |
| *B60R 11/00* | (2006.01) |

(52) U.S. Cl.
CPC ....... *B60N 2/42727* (2013.01); *B60N 2/4235* (2013.01); *B60R 7/04* (2013.01); *B60R 21/026* (2013.01); *A61G 2203/723* (2013.01); *B60R 2011/0007* (2013.01); *B60R 2021/0006* (2013.01); *B60R 2021/0009* (2013.01); *B60R 2021/0023* (2013.01); *B60R 2021/0266* (2013.01)

(58) Field of Classification Search
CPC .. B60N 2/793; B60R 5/00; B60R 7/00; B60R 7/04
See application file for complete search history.

(56) References Cited

U.S. PATENT DOCUMENTS

| | | | | |
|---|---|---|---|---|
| 4,690,448 | A * | 9/1987 | Fujisawa | B60R 7/04 296/37.8 |
| 5,106,143 | A | 4/1992 | Soeters | |
| 6,575,528 | B2 * | 6/2003 | Tiesler | B60R 7/04 296/214 |
| 7,222,906 | B2 * | 5/2007 | Sakakibara | B60R 7/04 296/24.34 |
| 7,401,831 | B2 | 7/2008 | Sturt | |
| 7,874,603 | B2 * | 1/2011 | Stoner | B60K 20/04 296/24.34 |
| 9,599,279 | B2 * | 3/2017 | Morris | F16M 11/041 |
| 9,752,608 | B2 * | 9/2017 | Winklbauer | B60R 13/02 |

(Continued)

FOREIGN PATENT DOCUMENTS

| | | |
|---|---|---|
| DE | 10013177 A1 | 9/2001 |
| DE | 102005005531 B3 | 4/2006 |

(Continued)

*Primary Examiner* — James A English
(74) *Attorney, Agent, or Firm* — Frank A. MacKenzie; Bejin Bieneman PLC

(57) ABSTRACT

A vehicle includes a floor and a center console supported by the floor. The center console includes a bottom adjacent to the floor and openings. At least some of the openings have an enlarged portion spaced from the bottom and a slot portion extending from the enlarged portion to the bottom. Fasteners are disposed in the enlarged portion and fixed relative to the floor.

20 Claims, 9 Drawing Sheets

(56) References Cited

U.S. PATENT DOCUMENTS

| | | | | |
|---|---|---|---|---|
| 2002/0139824 A1* | 10/2002 | Panhelleux | ............... | B60R 7/04 224/275 |
| 2008/0001422 A1* | 1/2008 | Kwolek | .............. | B60R 13/0206 296/24.34 |
| 2008/0315606 A1* | 12/2008 | Sturt | ...................... | B60N 3/002 296/24.34 |
| 2013/0234463 A1* | 9/2013 | Vasko | ....................... | B60R 7/04 296/1.08 |
| 2015/0232043 A1* | 8/2015 | Buza | .................. | B60R 13/0206 296/24.34 |
| 2015/0375689 A1* | 12/2015 | Nagata | .................... | B60R 11/00 296/24.34 |

FOREIGN PATENT DOCUMENTS

| | | |
|---|---|---|
| EP | 1099607 A1 | 5/2001 |
| JP | 2014184855 A | 10/2014 |

\* cited by examiner

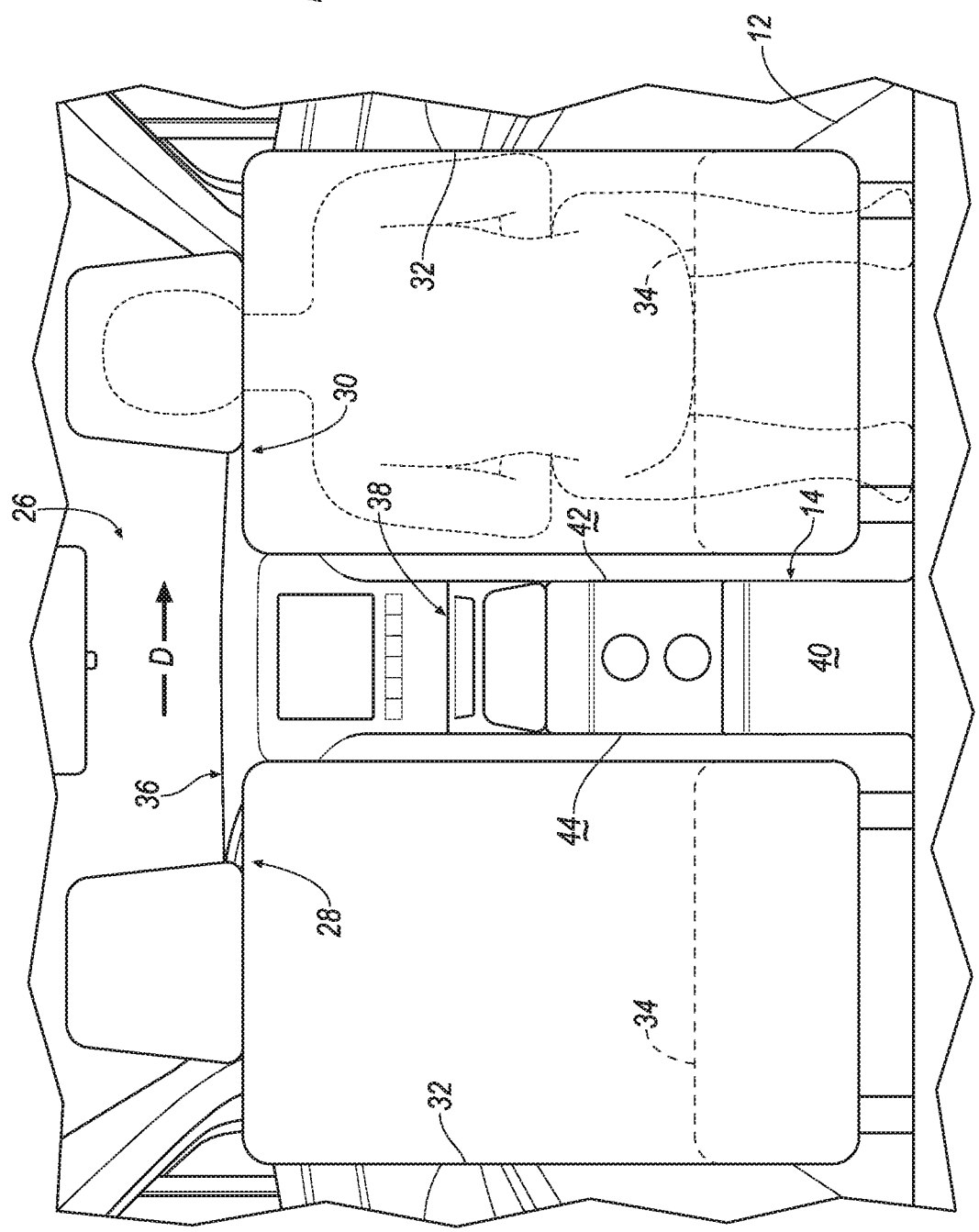

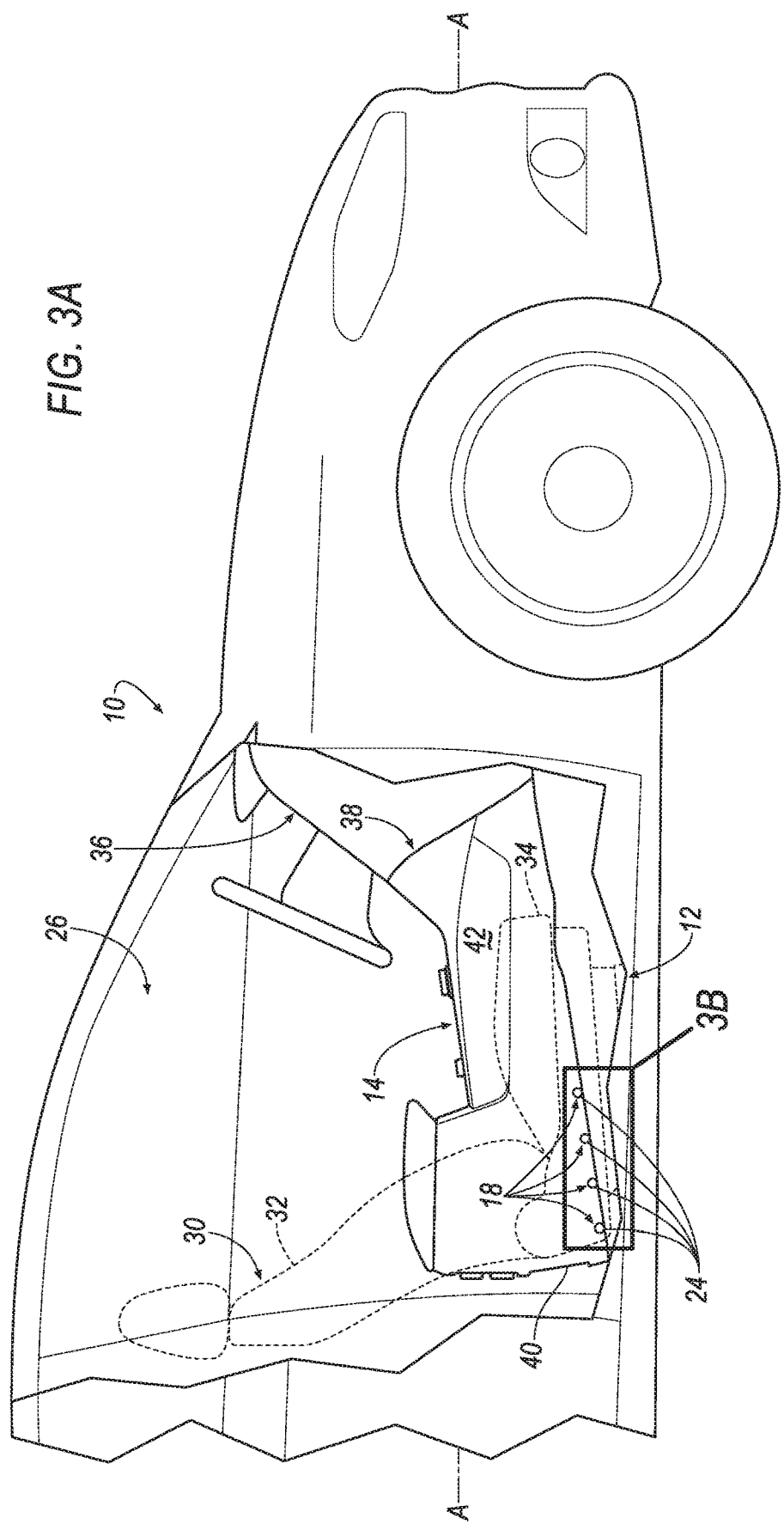

SLIDEABLY RELEASABLE CENTER CONSOLE

BACKGROUND

During a vehicle impact, occupants may move in a direction influenced by the momentum of the vehicle. Some vehicle impacts, e.g., side impact, frontal offset impacts, far side oblique impact, near side oblique impact, etc., may cause the occupants to move at an angle towards vehicle components, e.g., toward a pillar, door, center console, etc. In this situation, the momentum of the occupant may urge the lower body of the occupant to impact a center console.

BRIEF DESCRIPTION OF THE DRAWINGS

FIG. 2A is a rear view of the center console in the engaged position.

FIG. 3A is a side view of the center console including openings having an enlarged portion and a slot portion.

DETAILED DESCRIPTION

Figure 1:
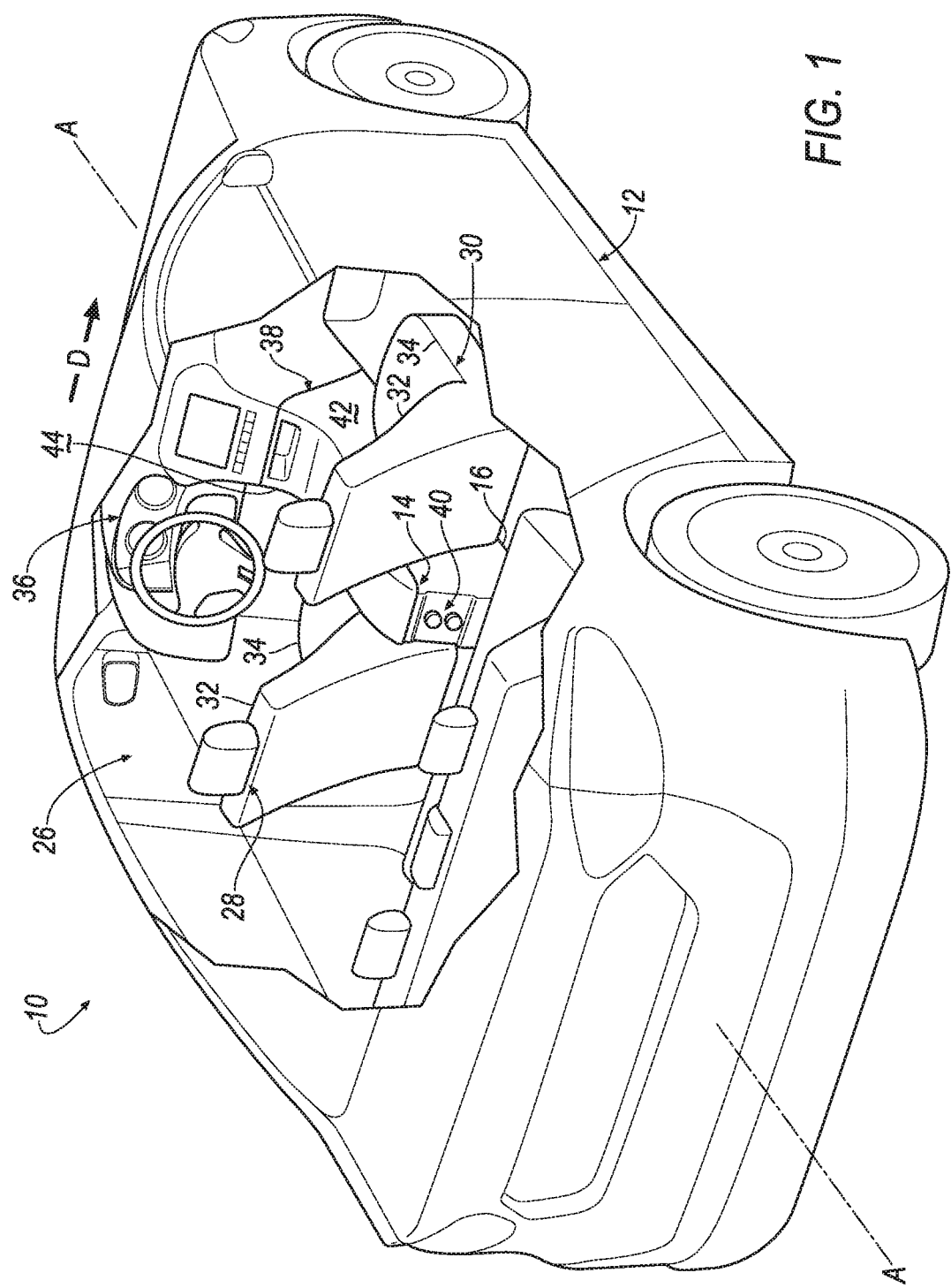
FIG. 1 is a perspective view of a vehicle including a center console in an engaged position.

A vehicle includes a floor and a center console supported by the floor. The center console includes a bottom adjacent to the floor and openings. At least some of the openings have an enlarged portion spaced from the bottom and a slot portion extending from the enlarged portion to the bottom. Fasteners are disposed in the enlarged portion and are fixed relative to the floor.

The fasteners may include a shaft having a cross-section, the cross-section of the shaft being larger than the slot portion.

The slot portion may be slideable relative to the shaft.

The slot portion may be deformable relative to the fastener.

The openings may be slideable relative to the shaft.

The openings mar be deformable relative to the fastener.

The center console may include a first side and a second side spaced from the first side in a cross-vehicle direction. At least some of the openings may be disposed on the first side.

The vehicle may include a driver seat and a passenger seat spaced from each other in the cross-vehicle direction. The first side may be disposed adjacent to the passenger seat.

The center console may include holes disposed on the second side and fasteners disposed in and completely surrounded by the holes. The holes may be fixed relative to the floor.

At least some of the openings may be disposed on the second side.

The center console may include holes disposed on at least one of the first side and the second side and fasteners disposed in and completely surrounded by the holes. The holes may be spaced from the openings along a longitudinal axis.

The holes may be fixed relative to the floor. The center console may be pivotable about the fasteners in the holes.

The center console may include slots disposed on at least one of the first side and the second side. The slots may be spaced from the openings along the longitudinal axis. Fasteners may be disposed in the slots and fixed relative to the floor. The center console may be moveable relative to the fasteners in the slots.

The vehicle may include an instrument panel. The center console may abut the instrument panel. The center console may include the first side releasably connected to the instrument panel.

The center console may include the second side spaced from the first side in the cross-vehicle direction. The second side may be releasably connected to the instrument panel.

The center console may include a front and a rear spaced from the front along the longitudinal axis. The openings may be spaced from each other along the longitudinal axis. The openings may be disposed adjacent to the rear of the center console.

With reference to the Figures, wherein like numerals indicate like parts throughout the several views, a vehicle 10 is generally shown. The vehicle 10 includes a floor 12 and a center console 14 supported by the floor 12. During a vehicle impact, an occupant may be forced into the center console 14. Specifically, a lower body of the occupant may impact the center console 14 during the vehicle impact, e.g., a side impact, a front oblique impact, etc. In this situation, the center console 14 is slideably releasable from an engaged position, shown in FIGS. 1, 2A, 3A, & 3B, to a disengaged position, shown in FIGS. 2B & 3C. The center console 14 absorbs energy from the lower body of the occupant as the center console 14 slideably releases from the floor 12.

The center console 14 includes a bottom 16 adjacent to the floor 12 and openings 18. At least some of the openings 18 have an enlarged portion 20 spaced from the bottom 16 and a slot portion 22 extending from the enlarged portion 20 to the bottom 16. Fasteners 24 are disposed in the enlarged portion 20 and are fixed relative to the floor 12. As the lower body of the occupant impacts the center console 14, the lower body of the occupant exerts a force on the center console 14. When the force is sufficient to dislodge the fasteners 24 from the enlarged portion 20 through the slot portion 22, the center console 14 slideably releases from the floor 12, i.e., releases from the engaged position. In this situation, fasteners 24 slide relative to the center console 14 from the enlarged portion 20 through the slot portion 22 to the bottom 16 of the center console 14. In other words, the center console 14 lifts off the fasteners 24, i.e., to the disengaged position. By slideably releasing from the floor 12, the center console 14 absorbs energy from the lower body of the occupant and may assist in preventing or reducing injury to the lower body of the occupant.

With reference to FIG. 1, the vehicle 10 includes a passenger cabin 26 to house occupants, if any, of the vehicle 10. The passenger cabin 26 may include one or more front seats, including a driver seat 28 and a passenger seat 30, disposed at a front (not numbered) of the passenger cabin 26. The driver seat 28 and the passenger seat 30 may be spaced from each other in a cross-vehicle direction D. The passenger cabin 26 may further include one or more rear seats (not numbered) disposed behind the front seats 28, 30. The passenger cabin 26 may also include third-row seats (not shown) at a rear (not numbered) of the passenger cabin 26. In FIG. 1, the driver seat 28 and passenger seat 30 are shown to be bucket seats, but the seats 28, 30 may be other types of seats. The position and orientation of the seats 28, 30 and components thereof may be adjustable by an occupant.

With continued reference to FIG. 1, the seats 28, 30 may include a seatback 32 and a seat bottom 34. The seatback 32 may be supported by the seat bottom 34 and may be stationary or movable relative to the seat bottom 34. The seatback 32 and/or the seat bottom 34 may be adjustable in multiple degrees of freedom. Specifically, the seatback 32 and/or the seat bottom 34 may themselves be adjustable, in other words, adjustable components within the seatback 32 and/or may be adjustable relative to each other.

With continued reference to FIG. 1, the vehicle 10 may include an instrument panel 36 disposed at the front of the passenger cabin 26. The instrument panel 36 may face toward the driver seat 28 and the passenger seat 30. The instrument panel 36 may extend in the cross-vehicle direction D, e.g., from one side to the other side of the vehicle 10. The instrument panel 36 may include vehicle controls, such as a steering wheel; gauges, dials, and information displays; heating and ventilation equipment; a radio and other electronics; etc.

With continued reference to FIG. 1, the center console 14 may be elongated along a longitudinal axis A, e.g., between the front seats 28, 30. In other words, the center console 14 is disposed between the driver seat 28 and the passenger seat 30. The center console 14 may support vehicle components, e.g., a gear selector, cup holders, a storage bin, etc. The center console 14 may include multiple components, e.g., panels, brackets, etc. Alternatively, the center console 14 may be a unitary construction. The center console 14 may be formed of any suitable type of material, e.g., plastic.

With continued reference to FIG. 1, the center console 14 may include a front 38 and a rear 40 spaced from the front 38 along the longitudinal axis A. The front 38 of the center console 14 may be adjacent to the instrument panel 36. For example, the front 38 of the center console 14 may abut the instrument panel 36. The rear 40 of the center console 14 may be disposed adjacent to the seatbacks 32 of the front seats 28, 30, i.e., between the seatbacks 32 of the driver seat 28 and the passenger seat 30. The rear 40 of the center console 14 may face the rear of the passenger cabin 26 and include vehicle components, such as cup holders, gauges, vents, etc.

With continued reference to FIG. 1, the center console 14 may include a first side 42 and a second side 44 spaced from the first side 42 in the cross-vehicle direction D. The first side 42 may be disposed adjacent to the passenger seat 30, and the second side 44 may be disposed adjacent to the driver seat 28. The first side 42 and the second side 44 may each be elongated along the longitudinal axis A from the front 38 to the rear 40 of the center console 14, i.e., from the instrument panel 36 to the seatbacks 32 of the front seats 28, 30.

Figure 2B:
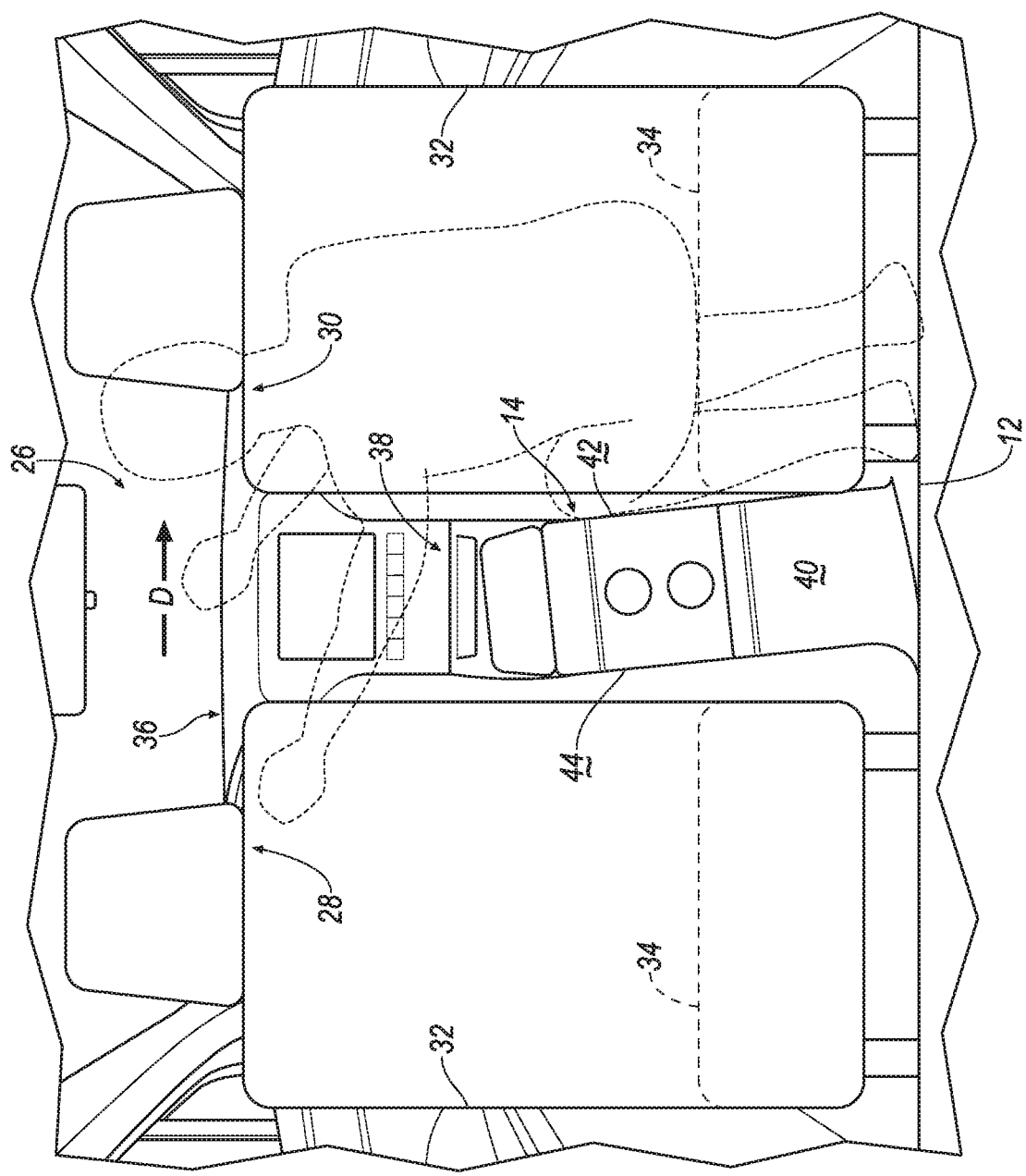
FIG. 2B is a rear view of the center console in a disengaged position.
Figure 3B:
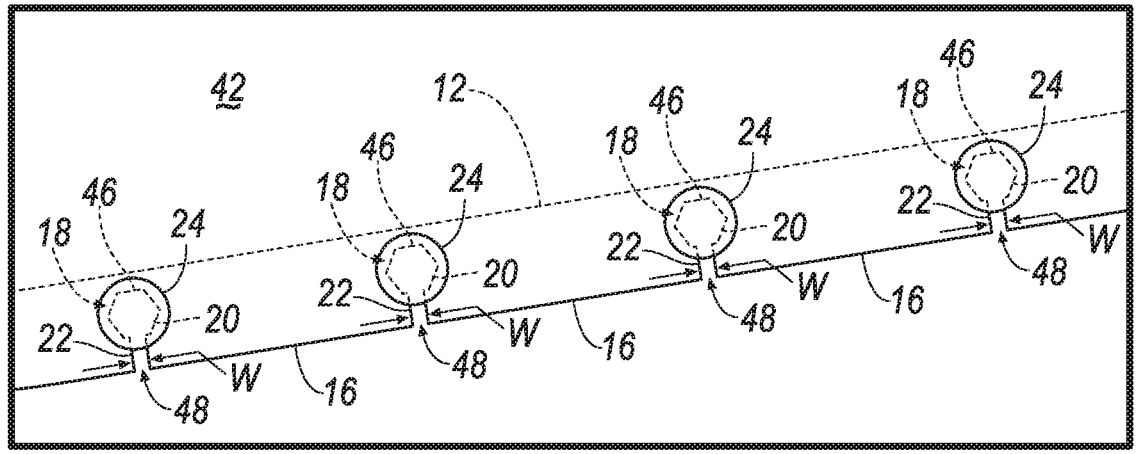
FIG. 3B is a magnified view of fasteners disposed in the openings when the center console is in the engaged position.
Figure 3C:
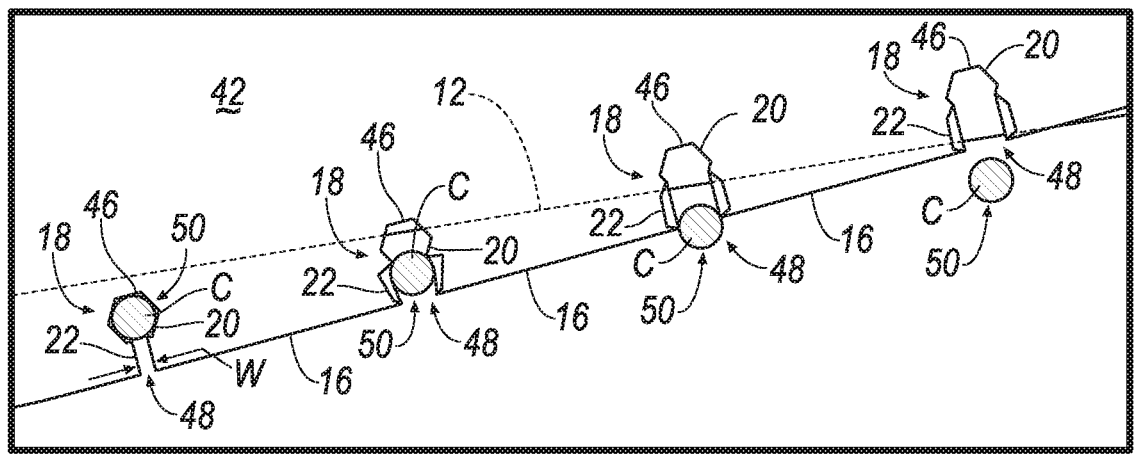
FIG. 3C is a cross-section view through the fasteners of FIG. 3B when the center console is releasing from the engaged position to the disengaged position.

The center console 14 may be slideably releasable from the engaged position, shown in FIGS. 1, 2A, 3A, & 3B to the disengaged position, shown in FIGS. 2B & 3C. Specifically, at least one of the first side 42 and the second side 44 may be slideably releasable from the engaged position to the disengaged position. In the engaged position, the bottom 16 of the center console 14 is adjacent the floor, e.g., abuts the floor 12, on both the first side 42 and the second side 44, as shown in FIG. 2A. In other words, the bottom 16 of the center console 14 rests on the floor in the engaged position. During movement from the engaged position to the disengaged position, at least one of the first side 42 and the second side 44 may slide relative to the floor 12 and the fasteners 24, as shown in FIG. 3C. In other words, at least one of the first side 42 and the second side 44 may be released from the engaged position.

In the disengaged position, at least one of the first side 42 and the second side 44 is spaced from the floor 12. Specifically, the bottom 16 of the center console 14 is spaced from the floor 12 on at least one of the first side 42 and the second side 44 when the center console 14 is in the disengaged position. As shown in FIG. 2B, the first side 42 is released and spaced from the floor 12 in the disengaged position. In other words, the bottom 16 of the center console 14 is spaced from the floor 12 along the first side 42. When the center console 14 is in the disengaged position, at least one of the first side 42 and the second side 44 is moveable relative to the floor 12.

The center console 14 may be fixed, either directly or through intermediate components, to the instrument panel 36. For example, the front 38 of the center console 14 may be fixed to the instrument panel 36 at each of the first side 42 and the second side 44. Alternatively, the front 38, i.e., the first side 42 and the second side 44, may be releasably connected to the instrument panel 36. In this situation, the first side 42 and the second side 44 may be connected to the instrument panel 36 when the center console 14 is in the engaged position. When the center console 14 is in the disengaged position, at least one of the first side 42 and the second side 44, e.g., the same side 42, 44 that releases from the floor 12, may release from, and move relative to, the instrument panel 36. In other words, at least one of the first side 42 and the second side 44 may be moveable relative to the instrument panel 36.

The openings 18 may be disposed on one or both sides of the center console 14, as set forth below. The openings 18 may be spaced from each other along the longitudinal axis A, as shown in FIGS. 3A-5B. The openings 18 may be disposed adjacent the rear 40 of the center console 14, i.e., adjacent to the seatbacks 32. The openings 18 may include a closed side 46 spaced from the bottom 16 and an open side 48 on the bottom 16 of the center console 14. The openings 18 extend from the closed side 46 to the open side 48.

The center console 14 may include any suitable number of openings 18. At least some of the openings 18 include the enlarged portion 20 and the slot portion 22 as shown in FIGS. 3A-5B. The other openings 18 may have a same or different shape. The other openings 18 may have any suitable shape. For example, the other openings 18 may include only the slot portion 22, i.e., have a uniform width from the closed side 46 to the open side 48.

With reference to FIG. 3B, the enlarged portion 20 may be designed to receive the fasteners 24. In other words, each enlarged portion 20 is sized, shaped, and positioned to receive one fastener 24. The enlarged portion 20 may partially surround the fastener 24. The enlarged portion 20 may be spaced from the open side 48 of the opening 18, i.e., the bottom 16 of the center console 14. The enlarged portion 20 may, for example, define the closed side 46 of the opening 18. Alternatively, the enlarged portion 20 may be disposed between the open side 48 and the closed side 46 of the opening 18. The enlarged portion 20 may have any suitable shape, e.g., circular, elliptical, hexagonal, octagonal, etc.

With continued reference to FIG. 3B, the slot portion 22 may extend from the enlarged portion 20 to the bottom 16, as set forth above. In other words, the slot portion 22 may extend from the open side 48 toward the closed side 46. The slot portion 22 may have a width W along the longitudinal axis A. In other words, the slot portion 22 may have two sides (not numbered) spaced from each other by the width W. The width W may extend any suitable amount along the longitudinal axis A. The width W may, for example, be uniform along the slot portion 22, e.g., from the enlarged portion 20 to the open side 48. Alternatively, the width W may taper along the slot portion 22, e.g., the width W may increase along the slot portion 22 from the enlarged portion 20 to the open side 48.

The fasteners 24 are fixed relative to the floor 12. The fasteners 24 may attach, either directly or through intermediate components, the center console 14 to the vehicle 10, e.g., the floor 12, in the engaged position. For example, the fasteners 24 may be attached directly to the floor 12, as shown in FIGS. 3B & 3C. Alternatively, the vehicle 10 may include a bracket (not shown) fixed to the floor 12. In this situation, fasteners 24 may attach the center console 14 to the bracket in the engaged position. The fasteners 24 may be any suitable type of fasteners, e.g., screws, bolts, etc.

In the engaged position, the fasteners 24 are disposed in the openings 18. Specifically, the fasteners 24 are disposed in the enlarged portion 20 of the openings 18, as shown in FIG. 3B. In the disengaged position, the fasteners 24 may be spaced from the openings 18. In other words, at least one of the first side 42 and the second side 44 may be spaced from the fasteners 24 in the disengaged position. In this situation, the center console 14, e.g., the bottom 16, may be at least partially spaced from the floor 12, i.e., spaced from the floor 12 along at least one side 42, 44.

With reference to FIG. 3C, the fasteners 24 may include a shaft 50 having a cross-section C. The cross-section C is smaller than the enlarged portion 20 of the openings 18 and is larger than the slot portion 22. Specifically, the cross-section C extends along the longitudinal axis A. The cross-section C of the shaft 50 may be larger than the slot portion 22. In other words, the cross-section C, i.e., a diameter, of the shaft 50 may be larger than the width W of the slot portion 22 along the longitudinal axis A. In this situation, the slot portion 22 may retain the fastener 24 in the enlarged portion 20 when the center console 14 is in the engaged position. The openings 18, i.e., the slot portion 22, may be slideable relative to the fasteners 24. For example, when the center console 14 releases from the engaged position, the openings 18 may slide upwardly relative to the fasteners 24. When the openings 18, i.e., the slot portion 22, slides relative to the fasteners 24, the openings 18, i.e., the slot portion 22, are deformed, e.g., plastically, relative to the fasteners 24, and the center console 14 moves relative to the floor 12 from the engaged position to the disengaged position. In this situation, the fasteners 24 may slide relative to the center console 14 from the enlarged portion 20 through the slot portion 22 to the bottom 16 of the center console 14.

The openings 18, i.e., the slot portion 22, may deform when the force exerted on the center console 14 by the occupant exceeds the threshold. The threshold may be any suitable value, e.g., greater than forces from inadvertent contact. The threshold may be chosen based on the width W of the slot portion 22 and/or the material of the center console 14. For example, a wider slot portion 22 relative to the shaft 50 of the fastener 24 may have a lower threshold than a narrow slot portion 22 relative to the shaft 50 of the fastener 24. As another example, a more ductile material of the center console 14 may have a lower threshold than a less ductile material.

Figure 4A:
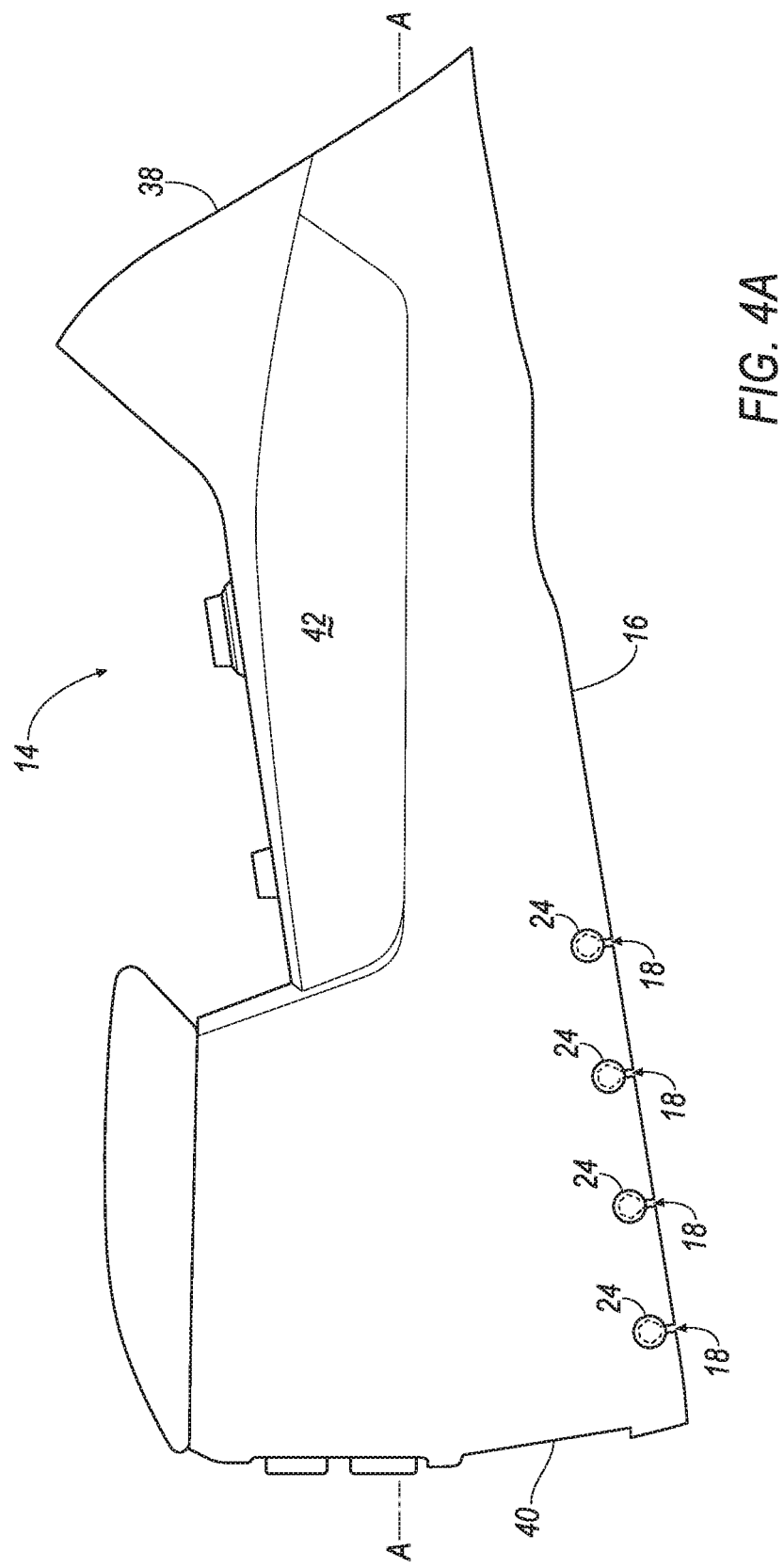
FIG. 4A is a side view of one embodiment of a first side of the center console.
Figure 4B:
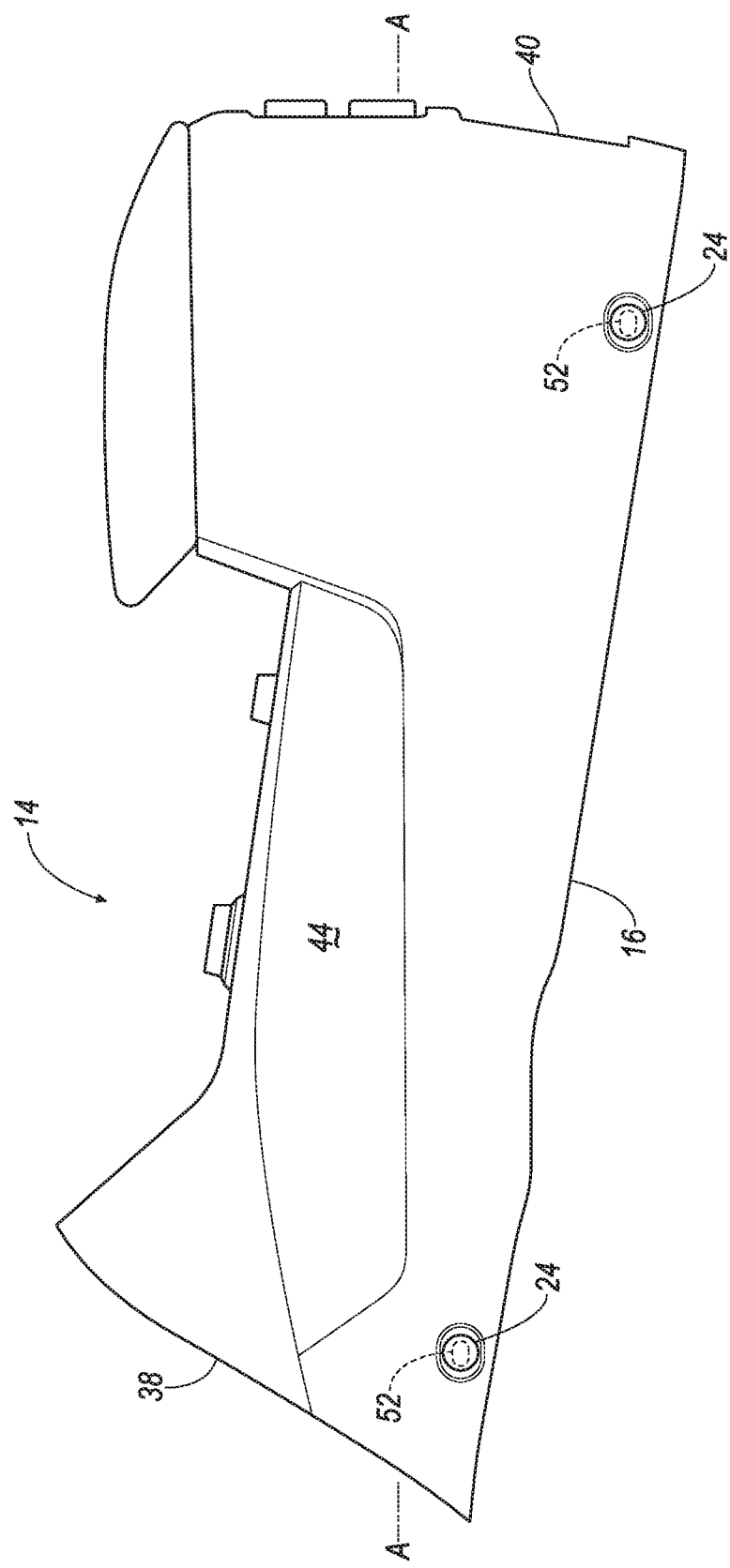
FIG. 4B is a side view of one embodiment of a second side of the center console.

The center console 14 may include holes 52 disposed on at least one of the first side 42 and the second side 44, as shown in FIG. 4B. The holes 52 may be designed to receive the fasteners 24. In other words, each hole is sized, shaped, and positioned to receive one fastener 24. The holes 52 may have the same size, e.g., diameter, as the enlarged portion 20, i.e., extend the same amount along the longitudinal axis A. The holes 52 may have a same or different shape as the enlarged portion 20.

The center console 14 may include fasteners 24 disposed in and completely surrounded by the holes 52, as shown in FIG. 4B. The holes 52 are fixed relative to the floor 12 by the fasteners 24. The holes 52 remain fixed relative to the floor 12 by the fasteners 24 during the vehicle impact. In other words, the holes 52 remain fixed relative to the floor 12 when the center console 14 releases from the engaged position to the disengaged position. In this situation, the holes 52 may prevent one side 42, 44 of the center console 14 from releasing to the disengaged position. The fasteners 24 disposed in the holes 52 may be the same size and type of fasteners 24 as the fasteners 24 disposed in the openings 18.

Figure 5A:
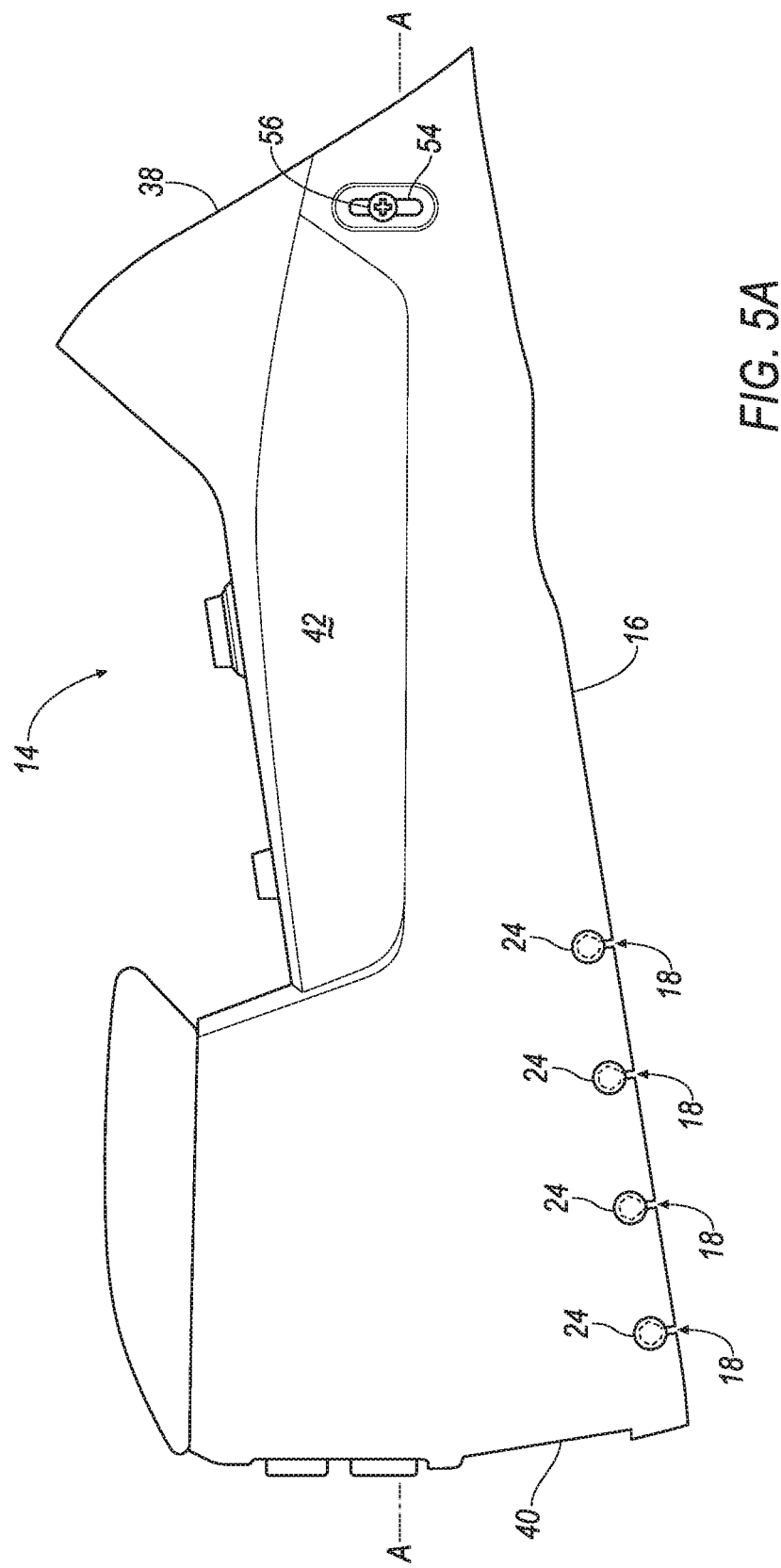
FIG. 5A is a side view of another embodiment of the first side of the center console.
Figure 5B:
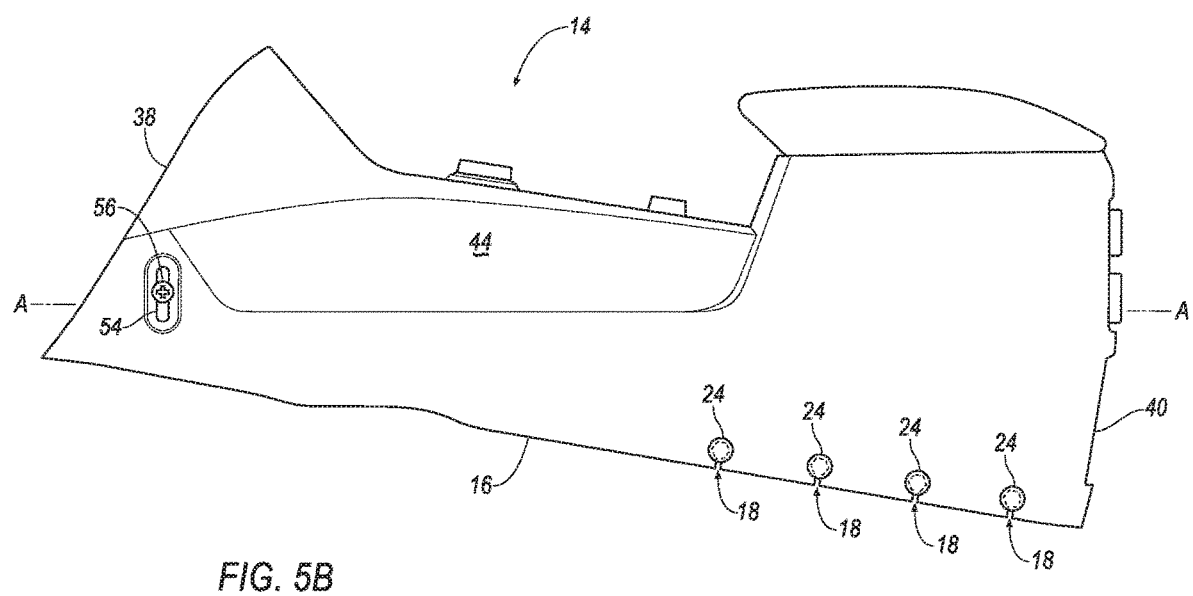
FIG. 5B is a side view of the embodiment of the second side of the center console of FIG. 5A.

The openings 18 may be disposed on one or both sides of the center console 14. For example, as set forth below, one embodiment of the center console 14 is shown in FIGS. 4A & 4B and another embodiment of the center console 14 is shown in FIGS. 5A & 5B. In the embodiment shown in FIGS. 4A & 4B, the openings 18 are disposed on one side of the center console 14. Specifically, in FIGS. 4A & 4B, the openings are disposed on the first side 42, i.e., a passenger side, of the center console 14. As another example, the openings 18 alternatively may be disposed on the second side 44, i.e., a driver side, of the center console 14. In the embodiment shown in FIGS. 5A & 5B, the openings 18 are disposed on both sides 42, 44 of the center console 14. Common numerals are used to identify common features in the two embodiments.

In the embodiment shown in FIGS. 4A & 4B, the openings 18 having the enlarged portion 20 and the slot portion 22 are disposed on the first side 42, i.e., adjacent to the passenger seat 30. In this situation, the center console 14 may include at least one hole 52 disposed on the second side 44, i.e., adjacent to the driver seat 28. At least one hole 52 may be disposed adjacent to the rear 40 of the center console 14. In this embodiment, the first side 42 is slideably releasable from floor 12. For example, when the center console 14 releases from the engaged position to the disengaged position, the first side 42 may slide upwardly relative to the floor 12 and release from the fasteners 24, i.e., the slot portion 22 of the opening 18 may deform relative to the fasteners 24. Additionally, the first side 42 may be releasable from the instrument panel 36. In other words, when the center console 14 releases from the engaged position to the disengaged position, the first side 42 may be moveable relative to the floor 12 and the instrument panel 36.

When the center console 14 releases from the engaged position to the disengaged position, the second side 44 of the center console 14 may remain fixed relative to the floor 12 by the fastener 24 disposed in the at least one hole 52. In other words, the bottom 16 of the center console 14 may remain adjacent to the floor 12 along the second side 44. The second side 44 may, for example, elastically deflect when the first side 42 slides upwardly and releases from the fasteners 24, as shown in FIG. 2B. By fixing the second side 44 relative to the floor 12, the first side 42 of the center console 14 may release to absorb energy from the occupant while the second side 44 retains the center console 14 on the floor 12 of the vehicle 10.

In the embodiment shown in FIGS. 5A & 5B, the openings 18 having the enlarged portion 20 and the slot portion 22 are disposed on both the first side 42 and the second side 44. In other words, the openings 18 are disposed adjacent to the driver seat 28 and the passenger seat 30. In this situation, both the first side 42 and the second side 44 may be slideably releasable from the floor 12. In other words, both the first side 42 and the second side 44 may slide upwardly relative to the floor 12 and release from the fasteners 24, i.e., the slot portion 22 of the opening 18 may deform relative to the fasteners 24. Additionally, both the first side 42 and the second side 44 may be releasable from the instrument panel 36. In other words, when the center console 14 releases from the engaged position to the disengaged position, the first side 42 and the second side 44 may each be moveable relative to the floor 12 and the instrument panel 36.

In this embodiment, the center console 14 may include one of slots 54 and the holes 52 disposed on each of the first side 42 and the second side 44. For example, the slots 54 and/or holes 52 may be disposed adjacent the front of the center console 14. In other words, the one of the slots 54 and the holes 52 may be spaced from the openings 18 along the longitudinal axis A. The center console 14 may include a front fastener 56 disposed in one of the slot and the hole. The front fastener 56 may be the same or different type of fastener as the fasteners 24.

The slots 54 may be moveable relative to the front fasteners 56 when the center console 14 is in the disengaged position. The slots 54 may be elongated in any suitable direction. For example, the slots 54 may be elongated upwardly from the floor 12 as shown in FIGS. 5A & 5B. As another example, the slots 54 may be elongated along the longitudinal axis A. The slots 54 are enclosed at both ends to retain the front fasteners 56 in the slots 54. In this situation, the slots 54 limit the movement of the center console 14 relative to the floor 12, e.g., the slots 54 are two-way slots. For example, the center console 14 may pivot about and slide relative to the front fasteners 56 in the disengaged position. By limiting the movement of the center console 14 relative to the floor 12, the center console 14 may release from the engaged position to the disengaged position to absorb energy of the occupant while the slots 54 prevent the center console 14 from becoming a projectile during the vehicle impact.

The holes 52 are fixed relative to the floor 12 by the front fasteners 56 when the center console 14 is in both the engaged position and the disengaged position. In the disengaged position, the center console 14 may be pivotable about the front fasteners 56. By fixing the holes 52 relative to the floor 12, the center console 14 may release from the engaged position to the disengaged position to absorb energy of the occupant while the holes 52 prevent the center console 14 from becoming a projectile during the vehicle impact.

In operation, the center console 14 is in the engaged position, as shown in FIGS. 1 & 2, under normal operating conditions of the vehicle 10. During the vehicle impact, the occupant may move within the vehicle 10 due to the momentum of the vehicle impact. As the occupant moves within the vehicle 10, the occupant may move toward, and impact, the center console 14. Specifically, the lower body of the occupant may impact the center console 14 during the vehicle impact. When the occupant impacts the center console 14, the occupant may exert a force on the center console 14. When the force exerted on the center console 14 exceeds the threshold, the center console 14 may slide relative to the fasteners 24 and the floor 12. In other words, the openings 18, i.e., the slot portion 22, may slide and deform relative to the fasteners 24. In this situation, the center console 14 slideably releases from the engaged position to the disengaged position. The openings 18 with the enlarged portion 20 and the slot portion 22 may be disposed on at least one of the first side 42 and the second side 44. In the embodiment when the openings 18 with the enlarged portion 20 and the slot portion 22 are disposed on the first side 42, the first side 42 are slideably releasable from the engaged position to the disengaged position, and the second side 44 remains fixed relative to the floor 12 of the vehicle 10 during the vehicle impact. In the embodiment when the openings 18 with the enlarged portion 20 and the slot portion 22 are disposed on both the first side 42 and the second side 44, each side is slideably releasable from the engaged position, and the front fastener 56 may limit the movement of the center console 14 relative to the floor 12 during the vehicle impact. When the center console 14 releases to the disengaged position, the center console 14 absorbs energy from the occupant to prevent or reduce injury to the lower body of the occupant.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a floor;
   a center console supported by the floor and including a first side and a second side spaced from the first side in a cross-vehicle direction, the first side and the second side each include a bottom adjacent the floor;
   the center console including openings disposed on the first side and the second side and extending through the sides in the cross-vehicle direction, at least some of the openings having an enlarged portion spaced from the bottom of the respective side and a slot portion extending from the enlarged portion to the bottom of the respective side; and
   fasteners extending through the enlarged portion in the cross-vehicle direction and fixed relative to the floor, the fasteners spaced from the bottom of the respective side.

2. The vehicle of claim 1, wherein the fasteners include a head disposed outboard of the respective side and a shaft extending in the cross-vehicle direction from the head through the enlarged portion, the shaft being engaged with the floor and having a cross-section being larger than the slot portion.

3. The vehicle of claim 2, wherein the slot portion is slideable relative to the shaft.

4. The vehicle of claim 3, wherein the slot portion is plastically deformable relative to the fastener.

5. The vehicle of claim 1, wherein the openings are slideable relative to the fasteners.

6. The vehicle of claim 5, wherein the openings are plastically deformable relative to the fastener.

7. The vehicle of claim 1, wherein the at least some of the openings are disposed on the first side.

8. The vehicle of claim 7, further comprising a driver seat and a passenger seat spaced from each other in a cross-vehicle direction, the first side disposed adjacent to the passenger seat.

9. The vehicle of claim 7, wherein the center console includes holes disposed on the second side and fasteners disposed in and completely surrounded by the holes, the holes being fixed relative to the floor and having the same diameter as the enlarged portion.

10. The vehicle of claim 1, wherein the at least some of the openings are disposed on both the first side and the second side.

11. The vehicle of claim 10, wherein the center console includes a front, holes disposed on the first side and the second side and adjacent to the front, and fasteners disposed in and completely surrounded by the holes, the holes being spaced from the openings along a longitudinal axis and having the same diameter as the enlarged portion.

12. The vehicle of claim 11, wherein the fasteners in the holes engage the floor, the center console being pivotable about the fasteners in the holes.

13. The vehicle of claim 10, wherein the center console includes a front, a slot disposed on of the first side and the second side and adjacent to the front, the slot being spaced from the openings along a longitudinal axis and elongated upwardly relative to the floor, wherein a fastener is disposed in the slot and fixed relative to the floor, the center console being pivotable about and slideable relative to the fastener in the slot.

14. The vehicle of claim 1, further comprising an instrument panel, and wherein the center console abuts the instrument panel, the center console including a first side releasably connected to the instrument panel.

15. The vehicle of claim 14, wherein the center console includes a second side spaced from the first side in a cross-vehicle direction, the second side being releasably connected to the instrument panel.

16. The vehicle of claim 1, wherein the center console includes a front and a rear spaced from the front along a longitudinal axis, the openings are spaced from each other along the longitudinal axis.

17. The vehicle of claim 16, wherein the openings are disposed adjacent to the rear of the center console.

18. The vehicle of claim 1, wherein the center console terminates at the first side and the second side in the cross-vehicle direction.

19. The vehicle of claim 1, wherein the fasteners are threaded.

20. The vehicle of claim 13, wherein the center console include a hole disposed on the other of the first side and the second side and adjacent to the front, the hole being spaced from the openings along a longitudinal axis and having the same diameter as the enlarged portion, wherein a fastener is disposed in the hole and engaged with the floor, the center console being pivotable about the fastener in the hole.

* * * * *